(12) United States Patent
Tanaka

(10) Patent No.: US 9,319,949 B2  
(45) Date of Patent: Apr. 19, 2016

(54) COMMUNICATION SETTING METHOD, WIRELESS BASE STATION, AND MOBILE STATION

(71) Applicant: Yoshinori Tanaka, Yokohama (JP)

(72) Inventor: Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/751,979

(22) Filed: Jan. 28, 2013

(65) Prior Publication Data
US 2013/0165122 A1 Jun. 27, 2013

Related U.S. Application Data

(63) Continuation of application No. PCT/JP2010/005050, filed on Aug. 12, 2010.

(51) Int. Cl.
| | |
|---|---|
| H04W 36/00 | (2009.01) |
| H04W 36/02 | (2009.01) |
| H04B 7/02 | (2006.01) |
| H04W 36/18 | (2009.01) |

(52) U.S. Cl.
CPC .............. H04W 36/02 (2013.01); H04B 7/024 (2013.01); H04W 36/18 (2013.01); H04W 36/0055 (2013.01)

(58) Field of Classification Search
CPC .. H04B 7/024; H04W 36/0055; H04W 36/02; H04W 36/18; H04W 24/02
USPC ........ 455/436, 438, 442, 452.2, 434; 370/331
See application file for complete search history.

(56) References Cited

U.S. PATENT DOCUMENTS

| | | | | |
|---|---|---|---|---|
| 7,003,311 | B2* | 2/2006 | Ebata et al. | 455/525 |
| 8,345,636 | B2* | 1/2013 | Ofuji et al. | 370/332 |
| 2002/0187786 | A1* | 12/2002 | Takano et al. | 455/442 |
| 2003/0043775 | A1* | 3/2003 | Kikuchi | 370/342 |
| 2006/0276190 | A1* | 12/2006 | Shaheen | 455/436 |
| 2007/0037601 | A1 | 2/2007 | Mittal et al. | |
| 2008/0014946 | A1 | 1/2008 | Kubota | |

(Continued)

FOREIGN PATENT DOCUMENTS

| | | |
|---|---|---|
| CN | 101064956 A | 10/2007 |
| CN | 101283619 A | 10/2008 |

(Continued)

OTHER PUBLICATIONS

3GPP TR 36.912 V9.1.0 (Dec. 2009); 3rd Generation Partnership Project; Technical Specification Group Radio Access Network; Feasibility study for Further Advancements for E-UTRA (LTE-Advanced) (Release 9); Dec. 2009.

(Continued)

Primary Examiner — Mong-Thuy Tran  
(74) Attorney, Agent, or Firm — Myers Wolin, LLC

(57) ABSTRACT

In a mobile communication system in an embodiment, when a handover of a mobile station which is a target of coordinated communications among multiple wireless base stations is detected, at least a part of setting procedure for the coordinated communications (CoMP setting procedure) is executed before completion of the handover. Hence, the coordinated transmission for the mobile station can be resumed earlier after the handover, and any reduction in the communication quality or throughput caused by the resume of the coordinated communication after the handover of the mobile station can be prevented.

18 Claims, 9 Drawing Sheets

(56) References Cited

U.S. PATENT DOCUMENTS

| | | | |
|---|---|---|---|
| 2008/0026761 A1* | 1/2008 | Usuda et al. | 455/442 |
| 2008/0146218 A1* | 6/2008 | Shimomura et al. | 455/425 |
| 2008/0198808 A1* | 8/2008 | Hwang et al. | 370/331 |
| 2009/0185539 A1* | 7/2009 | Ohta et al. | 370/331 |
| 2009/0268690 A1* | 10/2009 | Sebire | 370/332 |
| 2009/0316631 A1* | 12/2009 | Kato et al. | 370/328 |
| 2010/0203887 A1* | 8/2010 | Kim | 455/434 |
| 2010/0290413 A1* | 11/2010 | Kuwahara | 370/329 |
| 2010/0317292 A1* | 12/2010 | Takatani et al. | 455/63.1 |
| 2011/0014919 A1* | 1/2011 | Otte et al. | 455/442 |
| 2011/0039561 A1* | 2/2011 | Narasimha et al. | 455/436 |
| 2011/0039569 A1* | 2/2011 | Narasimha et al. | 455/452.2 |
| 2011/0117916 A1* | 5/2011 | Dahlen | 455/436 |
| 2011/0183669 A1* | 7/2011 | Kazmi | 455/434 |
| 2011/0263255 A1* | 10/2011 | Alonso-Rubio et al. | 455/436 |
| 2011/0269459 A1* | 11/2011 | Koo et al. | 455/434 |
| 2012/0088507 A1* | 4/2012 | Legg et al. | 455/436 |
| 2012/0184322 A1* | 7/2012 | Falconetti et al. | 455/524 |

FOREIGN PATENT DOCUMENTS

| | | |
|---|---|---|
| CN | 101640901 A | 2/2010 |
| WO | 2010/039066 A1 | 4/2010 |

OTHER PUBLICATIONS

3GPP TS 36.423 V9.1.0 (Dec. 2009); 3rd Generation Partnership Project; Technical Specification Group Radio Access Network; Evolved Universal Terrestrial Radio Access Network (E-UTRAN); X2 application protocol (X2AP) (Release 9); Dec. 2009.

Research in Motion UK Limited; "Discussion of Handover for CoMP"; Agenda Item: 7.5; 3GPP TSG RAN WG2 Meeting #67; R2-094282; Shenzhen, China; Aug. 24-28, 2009.

Fujitsu; "CoMP Cell Set Configuration"; Agenda Item: 7; 3GPP TSG-RAN WG2 Meeting #66; R2-093075; San Francisco, USA; May 4-8, 2009.

International Search Report issued for corresponding International Patent Application No. PCT/JP2010/005050 mailed Sep. 14, 2010 with English translation.

Office Action issued by the Canadian Intellectual Property Office on Jul. 8, 2014, for corresponding Canadian Patent Application No. 2806510.

Xiaodong et al., "Handover Mechanism in Coordinated Multi-Point Transmission/Reception System", Mar. 2010, pp. 31-35, vol. 8, No. 1, ZTE Communications.

Notice of Preliminary Rejection issued for corresponding Korean Patent Application No. 10-2013-7002138, mailed on May 29, 2014, with a full English translation.

First Notification of Office Action issued for corresponding Chinese Patent Application No. 201080068511.7 dated Dec. 23, 2014, with an English translation.

Office Action issued for corresponding Canadian Patent Application No. 2,806,510 dated Jun. 9, 2015.

Second (2nd) Notification of Office Action issued for corresponding Chinese Patent Application No. 201080068511.7 ssued on Sep. 14, 2015 with an English translation.

* cited by examiner

Joint Transmission

Coordinated beamforming/scheduling

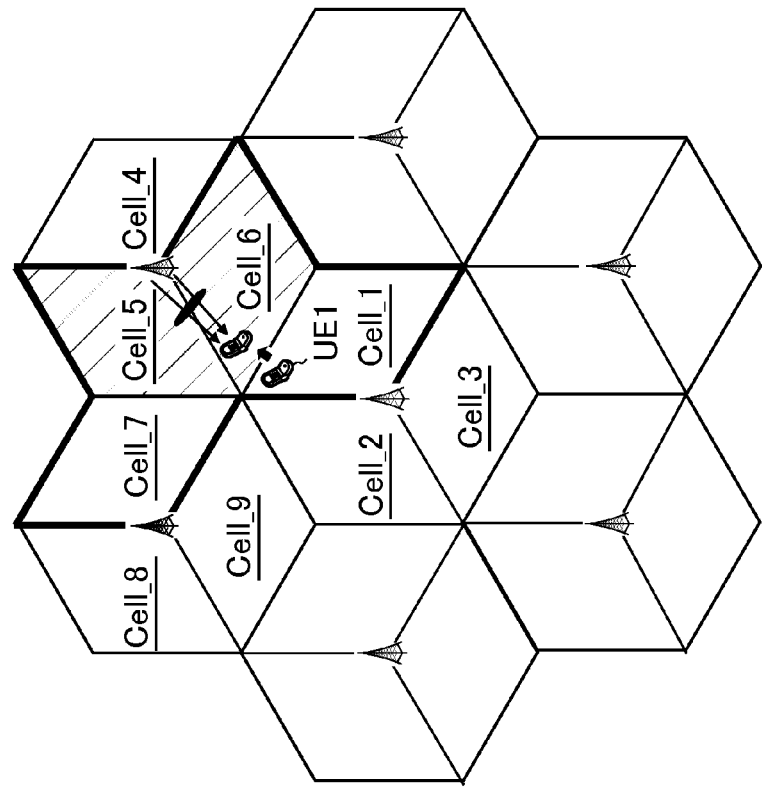
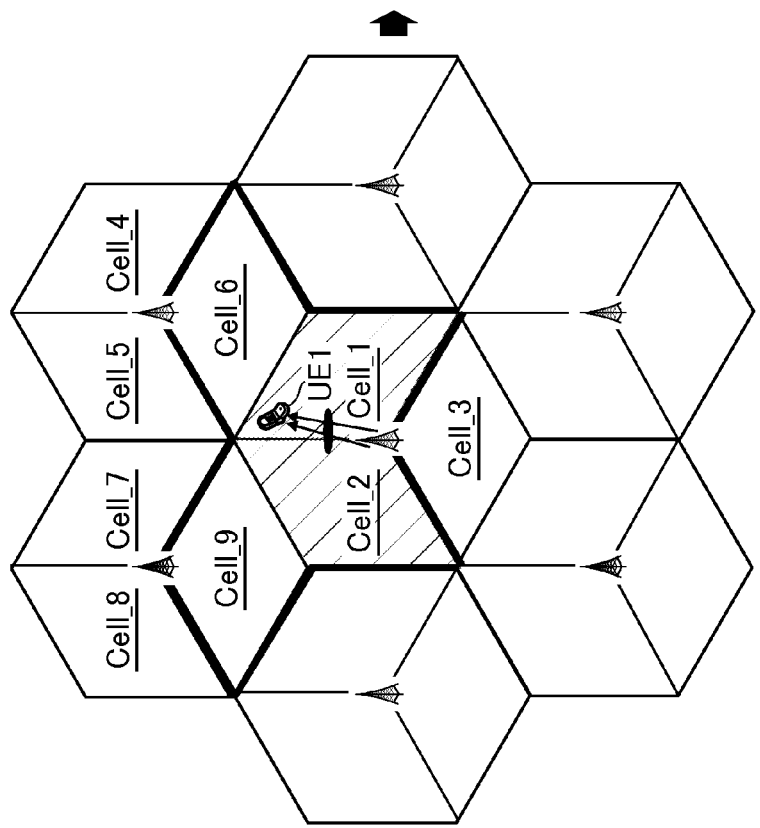

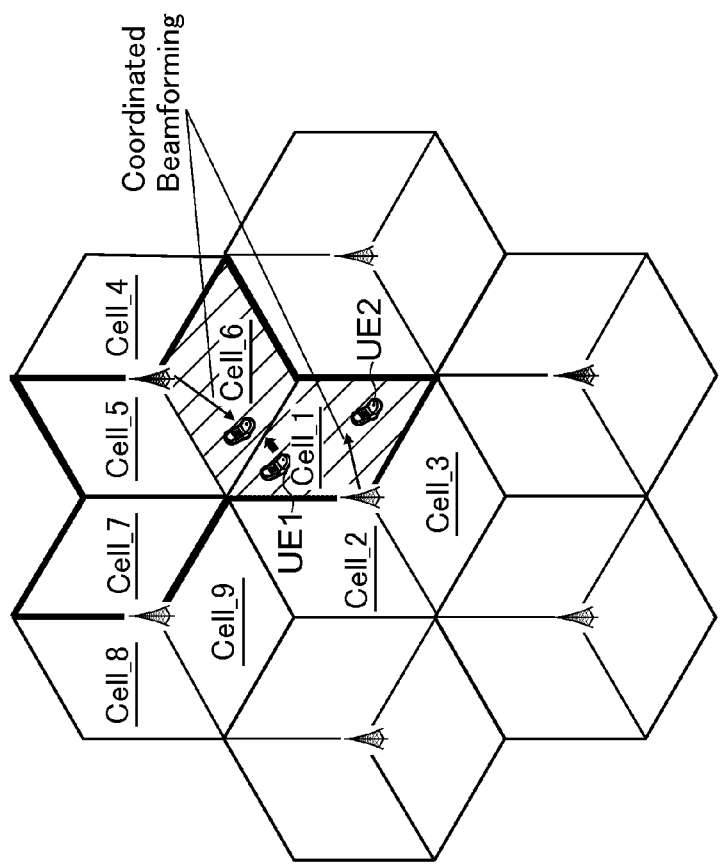
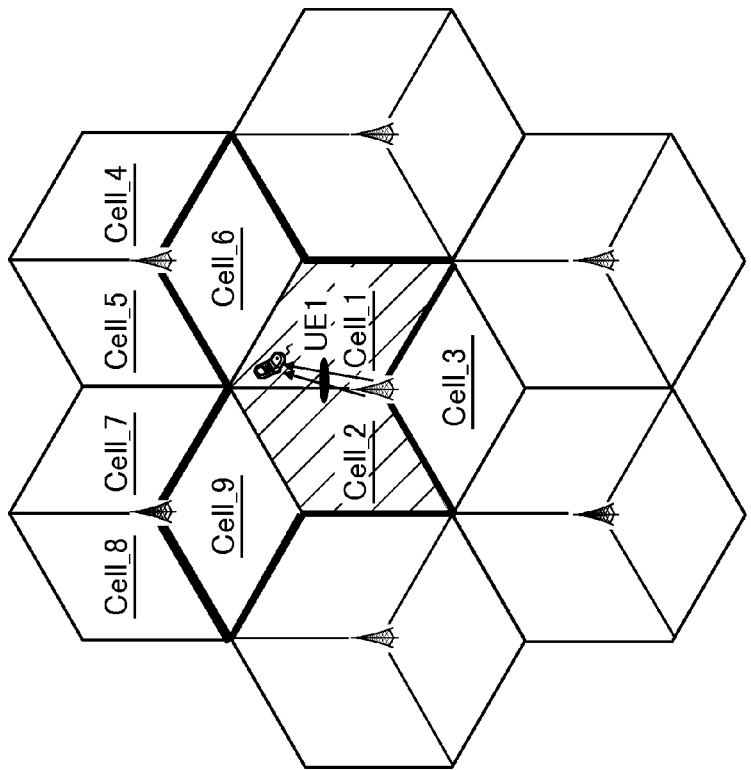

COMMUNICATION SETTING METHOD, WIRELESS BASE STATION, AND MOBILE STATION

CROSS-REFERENCE TO RELATED APPLICATIONS

This application is a continuation Application of a PCT international application No. PCT/JP2010/005050 filed on Aug. 12, 2010 in Japan, the entire contents of which are incorporated by reference.

FIELD

The present invention relates to a technique for communicating to mobile stations by multiple wireless base stations while coordinating among the wireless base stations in a mobile communication system.

BACKGROUND

The technique for cellar-type mobile communication systems has been shifted from the Universal mobile telecommunication system (UMTS) to the long term evolution (LTE). The LTE adopts the orthogonal frequency division multiplexing (OFDM) and single carrier-frequency division multiple access (SC-FDMA) techniques for downlink and uplink wireless accesses, respectively, achieving high-speed wireless packet communications with a downlink peak transmission rate of 100 Mb/s or higher and an uplink peak transmission rate of 50 Mb/s or higher. The 3rd Generation Partnership Project (3GPP), an international standardization organization, has initiated a study on the mobile communication system LTE-A (LTE-Advanced) based on the LTE, for achieving further faster communications. The LTE-A is aiming at a downlink peak transmission rate of 1 Gb/s and an uplink peak transmission rate of 500 Mb/s, and a various new techniques have been reviewed for a radio access scheme, a network architecture, and the like (Non-patent Reference 1).

The 3GPP is currently studying the coordinated multipoint (CoMP) communication scheme for the LTE-A. For downlink CoMP communications, techniques, such as a joint transmission, a coordinated beamforming, a coordinated scheduling, and a fast cell selection, have been considered.

Hereinafter, the basic concepts of the joint transmission, the coordinated beamforming, and the coordinated scheduling will be described with reference to FIG. 1. In the following description, the term "cell" is used to mean each geological range where a wireless base station provides a wireless service, and it may also be used to mean a part of the communication function managed by the wireless base station for communicating with user equipments in the each geological range. In FIG. 1, a serving cell is a sell that exchanges control information with a mobile station UE. A coordinated cell is a cell that communicates with a mobile station UE, together with the serving cell, using the CoMP communication technique (i.e., provides coordinated communications). Although coordinated transmissions are provided by the two cells in the example in FIG. 1, generally there may be three or more coordinated cells.

FIG. 1(a) schematically depicts the joint transmission by two cells, as one example.

In the joint transmission, identical data is sent to a single user equipment UE simultaneously from multiple cells using the same radio resource. In the example in FIG. 1(a), the mobile station UE measures the characteristics of the downlink propagation paths from the serving and coordinated cells, and reports the measurement results to the serving cell. The serving cell and the coordinated cell execute precoding and scheduling based on information that is fed back to them, and cooperatively send the identical data to the mobile station UE. Since the mobile station UE receives a synthetic signal from signals from the serving and coordinated cells, the reception SINR is improved as compared to the case where the signal is received only from the serving cell. The transmission data, propagation path information, scheduling information, precoding setting information, and the like are shared among the cells that cooperate with each other. As an interface among base stations for sharing the information, the LTE stipulates the X2 interface (Non-patent Reference 2).

FIG. 1(b) schematically depicts the coordinated beamforming and the coordinated scheduling by two cells, as one example.

In the coordinated beamforming and the coordinated scheduling, data is sent to different mobile stations (user equipments UE1 and UE2 in the example in FIG. 1(b)) in coordinated cells coordinated, and precoding or scheduling is cooperatively controlled. Precoding is predominantly cooperatively controlled in cooperating cells in the coordinated beamforming, while scheduling is predominantly cooperatively controlled in cooperating cells in the coordinated scheduling. Unlike the joint transmission, transmission data may not be shared among cooperating cells in the coordinated beamforming and the coordinated scheduling. In the example in FIG. 1(b), a serving cell sends data to the user equipment UE1, and the coordinated cell sends the data to the user equipment UE2. Here, precoding or scheduling is cooperatively controlled among the cells such that the interference waves from the serving cell to the user equipment UE2 and the interference waves from the coordinated cell to the user equipment UE1 are reduced. Hence, communications in the coordinated beamforming and the coordinated scheduling is improved compared to the cases where each cell communicates with the user equipment without any cooperation. In the coordinated beamforming and the coordinated scheduling, propagation path information, scheduling information, and the like are shared among cooperating cells.

Non-patent Reference 1: 3GPP TR 36.912 v9.1.0
Non-patent Reference 2: 3GPP TS 36.423 v9.1.0

DISCLOSURE OF THE INVENTION

Problems to be Solved by the Invention

In the mean times, when a user equipment under coordinated communications with multiple cells undergoes a handover, different cells may provide coordinated communications to the user equipment before and after the handover and the coordinated communication is temporarily suspended before the handover. In this case, in order to suppress any reduction in the communication quality or throughput, an earlier resume of the coordinated communication is more desirable.

SUMMARY

In the first aspect, a method of communication setting for providing coordinated communications by a plurality of wireless base stations to a mobile station, the plurality of wireless base stations providing wireless services, is provided.

This method of communication setting includes:

(A) measuring, by a first mobile station connected to a first wireless base station, a reception quality of a reference signal from the plurality of wireless base stations including the first wireless base station and a second wireless base station adjacent to the first wireless base station, and notifying the first wireless base station of the reception quality; and (B) notifying the second wireless base station by the first wireless base station, of the notified reception quality, or information about a candidate wireless base station that is a candidate of a wireless base station for the coordinated communications identified based on the notified reception quality, as first information for providing the coordinated communications to the first mobile station by the plurality of wireless base stations including the second wireless base station.

In a second aspect, a wireless base station as a first wireless base station for providing coordinated communications with other wireless base station as a second wireless base station to a mobile station is provided.

This wireless base station includes:

(C) a first transceiver that connects to the mobile station and sends and receives a signal; and (D) a second transceiver that sends and receives a signal to and from the other wireless base station.

The first transceiver receives, from a first mobile station connected to the first wireless base station, a notification of measurement results of reception quality of reference signals from a plurality of wireless base stations including the first wireless base station and the second wireless base station adjacent to the first wireless base station, in the first mobile station. The second transceiver notifies the second wireless base station, of the notified reception quality, or information about a candidate wireless base station that is a candidate of a wireless base station for the coordinated communications identified based on the notified reception quality, as first information for providing the coordinated communications to the first mobile station by the plurality of wireless base stations including the second wireless base station.

In a third aspect, a wireless base station a second wireless base station for providing wireless services and coordinated communications with other wireless base station as a first wireless base station to a mobile station is provided.

The second wireless base station includes:

(E) a first transceiver that connects to the mobile station and sends and receives a signal; and (F) a second transceiver that sends and receives a signal to and from the first wireless base station.

The second transceiver receives from the first base station, as first information for executing coordinated communications among a plurality of wireless base stations including the second wireless base station for a first mobile station connected to the first wireless base station adjacent to the second wireless base station, a reception quality of reference signals from the plurality of wireless base stations including the second wireless base station and the first wireless base station in the first mobile station, or a notification of information about a candidate wireless base station that is a wireless base station for a candidate of the coordinated communications.

In a fourth aspect, a mobile station that is provided with coordinated communications by a plurality of wireless base stations providing wireless services is provided.

The mobile station includes:

(G) a third transceiver that sends and receives a signal to and from a wireless base station; and (H) a quality measurement section that measures a reception quality of reference signals from the plurality of wireless base stations including a first wireless base station and a second wireless base station adjacent to the first wireless base station.

The third transceiver notifies the first wireless base station of the measured reception quality. Thereby enabling the first wireless base station to notify of the second wireless base station, as first information for executing coordinated communications among the plurality of wireless base stations including the second wireless base station to the mobile station, the notified reception quality, or information about a candidate wireless base station that is a candidate of a wireless base station for the candidate coordinated communications identified by the first wireless base station based on the notified reception quality.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIGS. 2A and 2B are diagrams illustrating a handover of user equipments in a mobile communication system where multiple cells are selected as coordinated cell candidates for a user equipment;

FIGS. 3A and 3B are diagrams illustrating a handover of a mobile station in a mobile communication system where multiple cells are selected as coordinated cell candidates for the mobile station;

DESCRIPTION OF EMBODIMENTS

Figure 1A:
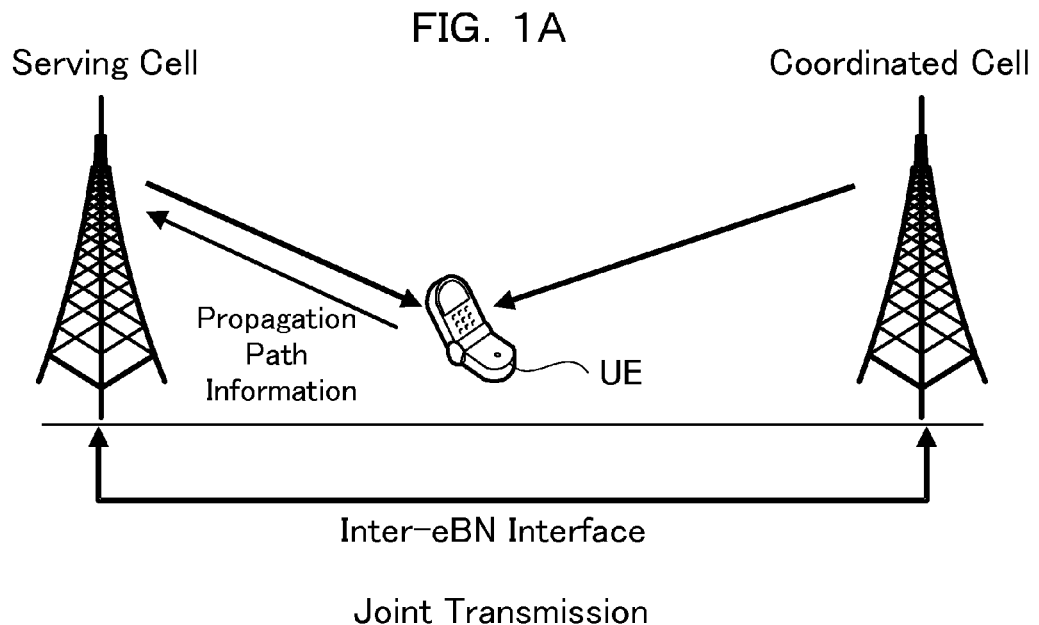
FIGS. 1A and 1B are diagrams illustrating the basic concept of the CoMP communication scheme.

In the following description, evolutional Node Bs as wireless base stations may be abbreviated as "eNBs", while user equipments as mobile stations may be abbreviated as "UEs", where necessary. One evolutional Node B manages one or more cells. The term "cell" is used to mean each geological range where a wireless evolutional Node B provides a wireless service, and it may also be used to mean a part of the communication function managed by the wireless evolutional Node B for communicating with user equipments in the each geological range. The term "coordinated cell" is used to mean a cell where communications are made to user equipments by cooperating with the serving cell of the user equipments, and the term "cooperating eNB" is used to mean a wireless evolutional Node B that manages a coordinated cell and makes coordinated communications with user equipments by cooperating with a wireless evolutional Node B managing a serving cell.

Here, before describing embodiments, the method of selecting multiple cells for coordinated communications in the cells for user equipments, for facilitating understanding of the embodiments.

More specifically, coordinated communications for all cells in a mobile communication system are not realistic since the processing for measuring the characteristics of the downlink propagation path in a user equipment and the amount of data for feed backing the measured values to the wireless evolutional Node B become too extensive. Hence, relatively a small number of cells are selected as cell candidates (hereinafter, referred to as "coordinated cell candidates") for coordinated communications. In the following, techniques of selecting coordinated cell candidates will be discussed, where a user equipment uses the reference signal received powers (RSRPs) in surrounding cells for reporting to a wireless evolutional Node B, for example.

In a first technique of selecting coordinated cell candidates, when the RSRP value $P_i$, as a reception quality of a cell i of surrounding cells of a user equipment satisfies the following Eq. (1), the cell i is selected as a coordinated cell candidate. Alternatively, a certain number of cells in the descending order of $P_i/P_0$ may be selected among surrounding cells that satisfy Eq. (1). At this time, a user equipment that measures the reception SINR of a downlink signal in that user equipment smaller than a predetermined value is selected as target for coordinated communications, for example. Such a user equipment is typically a user equipment located in a periphery of a cell. This technique is based on the idea that other cells sending signals that is received by a user equipment at a higher level relative to the level of received signals from the serving cell may become interference sources with higher level when the other cells do not participate in the coordinated communications. In other words, selecting these cells (cells other than the serving cells) as coordinated cells can significantly reduce the interference.

Eq. (1)

$$\frac{P_i}{P_0} \geq \gamma \quad (1)$$

In Eq. (1):

$P_0$ is the RSRP value relative to the reference signal from the serving cell, $P_i$ is the RSRP value relative to the reference signal from a surrounding cell i, and $\gamma$ is a predetermined threshold.

In a second technique of selecting coordinated cell candidates, when the estimation of reception SINR as a reception quality in a user equipment when a certain surrounding cell i is added to coordinated cells becomes better, by predetermined value, than the reception SINR in the user equipment when the cell i is not added to the coordinated cells, as indicated in Eq. (2), the cell i is selected as the coordinated cells of coordinated communications for the user equipment. $SINR_{i,CoMP}$ and $SINR_{i,NON\text{-}CoMP}$ in Eq. (2) are expressed in Eqs. (3) and (4), respectively. In Eqs. (3) and (4), N is the reception noise power in the user equipment.

Eq. (2)

$$\frac{SINR_{i,CoMP}}{SINR_{i,NoN-CoMP}} \geq \gamma \quad (2)$$

Eq. (3)

$$SINR_{i,CoMP} = \frac{P_0 + P_i}{\sum_{j \neq 0, i} P_j + N} \quad (3)$$

Eq. (4)

$$SINR_{i,NoN-CoMP} = \frac{P_0}{\sum_{j \neq 0} P_j + N} \quad (4)$$

Next, with reference to FIGS. 2 to 4, a scenario will be discussed where a user equipment undergoes a handover in a mobile communication system multiple cells are selected as coordinated cell candidates for the user equipment.

FIG. 2 depicts an example where a common coordinated communication mode (one of the CoMP communication technique described above) is used before and after the handover of the user equipment UE. FIG. 2(a) depicts a situation where a serving cell Cell_1 provides coordinated transmissions, with joint transmissions, to a user equipment UE1 connected to the serving cell Cell_1, by using a cell Cell_2 selected as a coordinated cell, among surrounding coordinated cell candidates Cell_2, Cell_6, and Cell_9 before a handover. FIG. 2(b) depicts a situation where the serving cell Cell_1 provides coordinated transmissions, with joint transmissions, to the user equipment UE1 connected to the serving cell Cell_6, by using a cell Cell_5 selected as a coordinated cell, among surrounding coordinated cell candidates Cell_1, Cell_5, and Cell_7 after the handover. In FIG. 2, the areas of the coordinated cell candidates are enclosed with thick lines.

FIG. 3 depicts an example where different coordinated communication modes (one of the CoMP communication technique described above) are used before and after the handover of the user equipment UE. FIG. 3(a) depicts a situation where a serving cell Cell_1 provides coordinated transmissions, with joint transmissions, to a user equipment UE1 connected to the serving cell Cell_1, by using a cell Cell_2 selected as a coordinated cell, among surrounding coordinated cell candidates Cell_2, Cell_6, and Cell_9 before a handover. FIG. 3(b) depicts a situation where cells Cell_6 and Cell_1 provide coordinated transmissions, with the coordinated beamforming or the coordinated scheduling, to user equipments UE1 and UE2, respectively, after the handover of the user equipments UE1. Also in FIG. 3, the areas of the coordinated cell candidates are enclosed with thick lines.

In order to resume coordinated transmissions for a user equipment after the handover of the user equipment, setting processing that may include the following processing (i) to (vi) (hereinafter, referred to as "CoMP setting procedure") may be executed.

(i) a wireless evolutional Node B (wireless evolutional Node B that manages the serving cell after the handover) requests signal measurements (e.g., the RSRPs) in surrounding cells of the user equipment, to that user equipment;

(ii) the user equipment notifies the wireless evolutional Node B of the signal measurement results or coordinated cell candidates;

(iii) when the user equipment notifies no coordinated cell candidate in (ii), the wireless evolutional Node B determines coordinated cell candidates and notifies the user equipment of them;

(iv) the wireless evolutional Node B requests the user equipment to measure propagation path information (e.g., the channel status information (CSI)) between the user equipment and each of the coordinated cell candidates;

(v) the user equipment measures the propagation path information with the coordinated cell candidates, and notifies the wireless evolutional Node B of the measurement results; and (vi) the wireless evolutional Node B determines a coordinated cell, and exchanges, with coordinated cell, information for executing coordinated transmissions to the user equipment.

Figure 4:
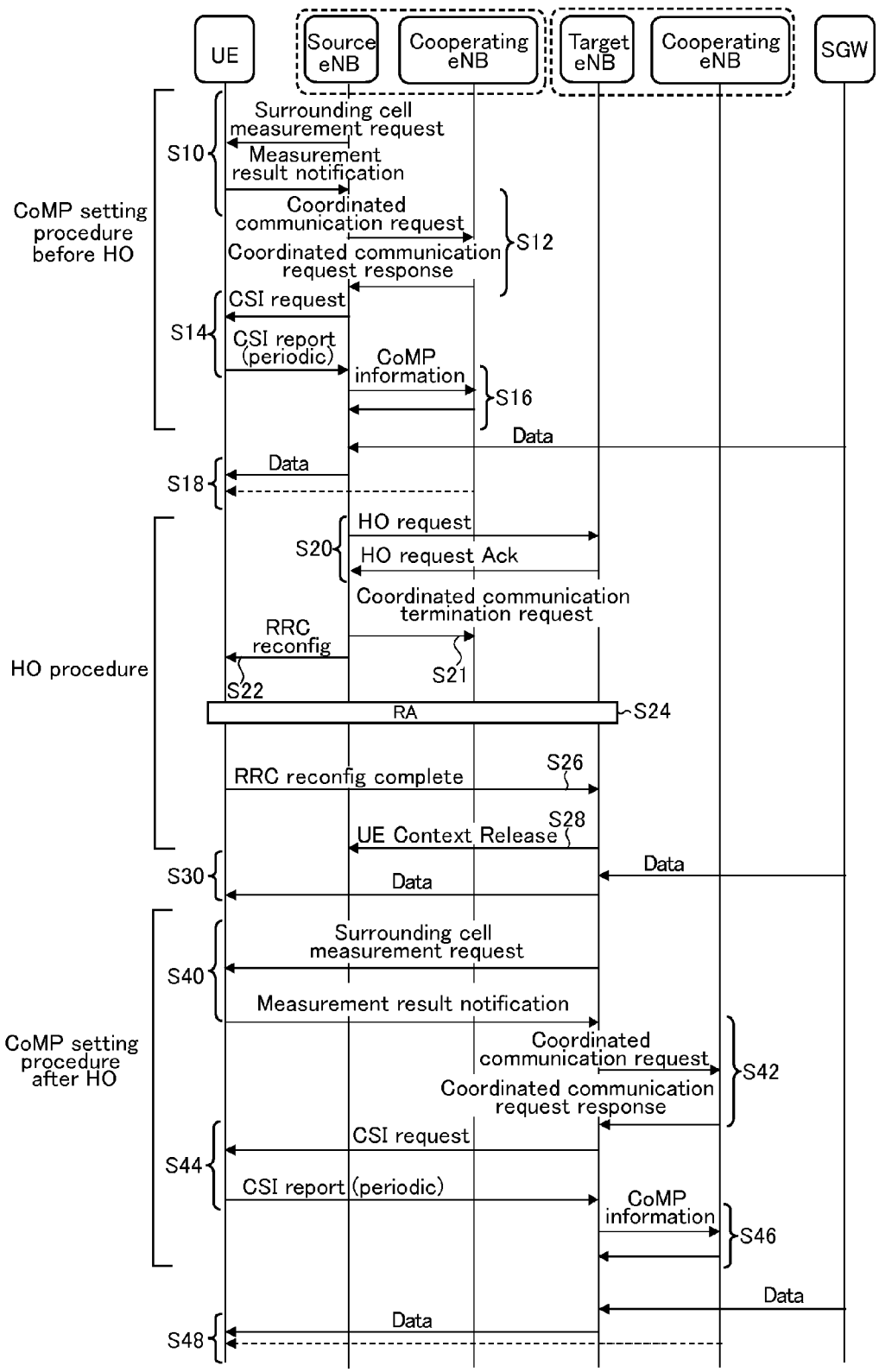
FIG. 4 is a diagram illustrating an example of a series of sequences of a CoMP setting procedure before and after a handover for a mobile station.

Here, an example of a series of sequences of the CoMP setting procedure before and after the handover (HO) of the user equipment UE is depicted in FIG. 4. In the sequence depicted in FIG. 4, as one example, a user equipment UE undergoes a handover when data is sent to that user equipment UE in the CoMP communication technique by means of the joint transmission. More specifically, before the handover of the user equipment UE, a source evolutional Node B (source eNB) and a cooperating evolutional Node B (cooperating eNB) sends data to the user equipment UE; after the handover, a target evolutional Node B (target eNB, the wireless evolutional Node B that manages a new serving cell) and the cooperating evolutional Node B (the cooperating eNB) send data to the user equipment UE. Here, the term "cooperating evolutional Node B" (cooperating eNB) means a wireless evolutional Node B that manages a coordinated cell, and provides coordinated communications among cells to the user equipment while cooperating with a wireless evolutional Node B that manages the serving cell.

In this sequence, before the handover (HO), after executing the CoMP setting procedure (Steps S10 to S16), the source evolutional Node B (source eNB) and its cooperating evolutional Node B (cooperating eNB) executes coordinated communications (coordinated transmissions in this case) to the user equipment UE (Step S18). In response to the handover of the user equipment UE being detected (Step S20), a coordinated communication that is being executed is terminated (Step S21) and a series of handover procedures is executed (Steps S20 to S28). Once the handover procedure is completed, data is sent to the user equipment UE via the target evolutional Node B (target eNB) (Step S30). Thereafter, the target eNB executes the CoMP setting procedure from the beginning (Step S40 and the subsequent steps).

In the sequence depicted in FIG. 4, no CoMP setting procedure is executed during the handover procedure, the target eNB executes the CoMP setting procedure from the beginning, after the handover. That is, no CoMP setting procedure is executed during the handover procedure, and accordingly, start of coordinated communication is delayed after the handover, which may cause reduced communication qualities or throughput.

(1) First Embodiment

Hereinafter, a first embodiment will be described.

(1-1) Summary of CoMP Setting Procedure in Present Embodiment

First, a summary of the CoMP setting procedure in a mobile communication system of the present embodiment will be described.

Figure 1B:
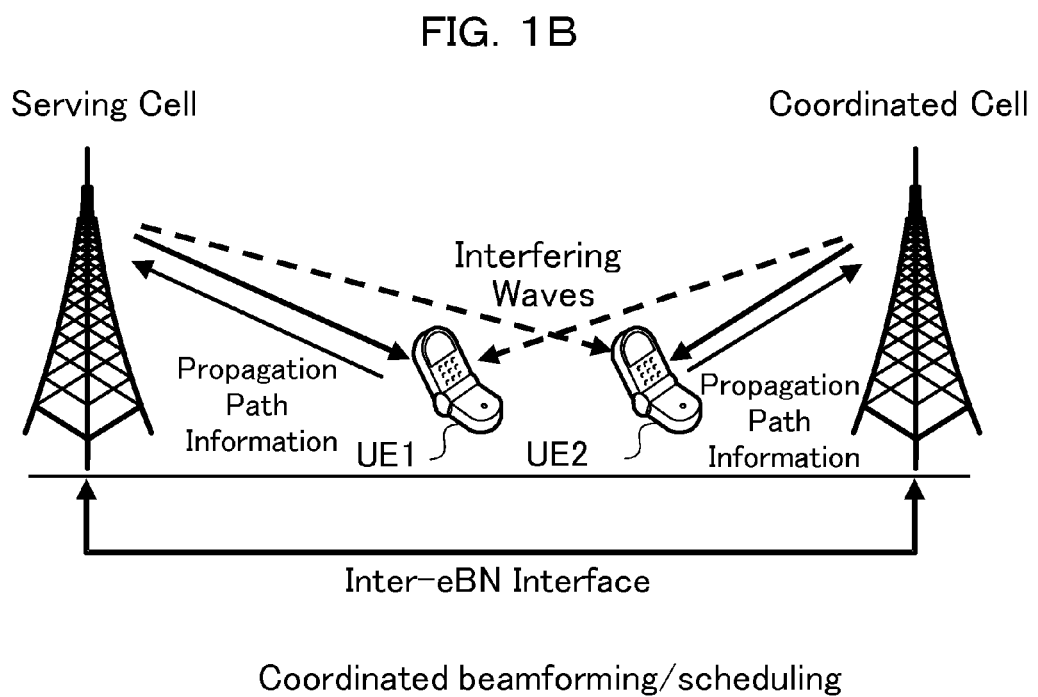

In the mobile communication system of the present embodiment, as depicted in FIG. 1, communications are made for a user equipment while multiple cells cooperate with each other. For example, coordinated transmissions are executed where multiple wireless evolutional Node Bs (hereinafter, abbreviated as "eNBs") cooperate with each other for transmissions to a user equipment. When a user equipment undergoes a handover while a coordinated transmission is being executed to user equipment, the cell coordinating to the user equipment may be updated and the coordinated transmission before the handover is suspended. When the CoMP setting procedure is executed from its beginning after completion of the handover, however, resume of the coordinated transmission may be delayed. Thus, in the present embodiment, the CoMP setting procedure is executed during the handover procedure in a duplicated manner. In other words, in the present embodiment, when a handover of a user equipment is detected during a coordinated transmission to that user equipment, at least a part of the CoMP setting procedure that may include the processing (i) to (vi) described above is executed before completion of the handover, in order to resume the coordinated transmission for the user equipment earlier after the handover.

Before the handover, a user equipment of the present embodiment periodically receives reference signals from surrounding evolutional Node Bs to obtain the results of signal measurements (e.g., the RSRPs), and notifies the evolutional Node B (i.e., the source evolutional Node B (source eNB) to be handed over) of the results. In response to detecting a handover of the user equipment, the source evolutional Node B (first wireless base station) immediately notifies a target evolutional Node B (second wireless base station) of first information for executing coordinated communications, through a communication link between the evolutional Node Bs. The first information includes results of signal measurements from the surrounding cells which is notified from user equipment when the handover is detected, or coordinated cell candidates identified based on the results. The techniques described above, i.e., the techniques indicated using Eq. (1) or Eq. (2), may be applied as a technique of identifying coordinated cell candidates, for example.

In the sequence depicted in FIG. 4, in order to execute the CoMP setting procedure after completion of the handover procedure, coordinated cell candidates are identified by an evolutional Node B that is a target of the handover. In contrast, in the present embodiment, before completion of the handover procedure, the serving cell of user equipment after the handover (hereinafter, referred to as "target cell") and its coordinated cell may be identified in the source evolutional Node B. In this identification technique, if the technique represented by Eq. (1) described above, for example, $P_0$ may be calculated as the RSRP value relative to the reference signal from the target cell. More specifically, at the time when a handover of the user equipment is detected, the target cell is included in the surrounding cells, of which signal measurement results are notified from the user equipment to the source evolutional Node B. Hence, cell candidates of a coordinated cell of a target cell after the handover (hereinafter, referred to as "coordinated cell candidates") can be identified by the source evolutional Node B.

Further, in the present embodiment, preferably, the processing (iii) described above is executed during the CoMP setting procedure, before completion of the handover procedure of the user equipment. More preferably, the processing (iii) and (iv) described above is executed during the CoMP setting procedure, before completion of the handover procedure of the user equipment. Further preferably, the processing (iii) to (v) described above is executed during the CoMP setting procedure, before completion of the handover procedure of the user equipment.

(1-2) Specific CoMP Setting Procedure

Figure 5:
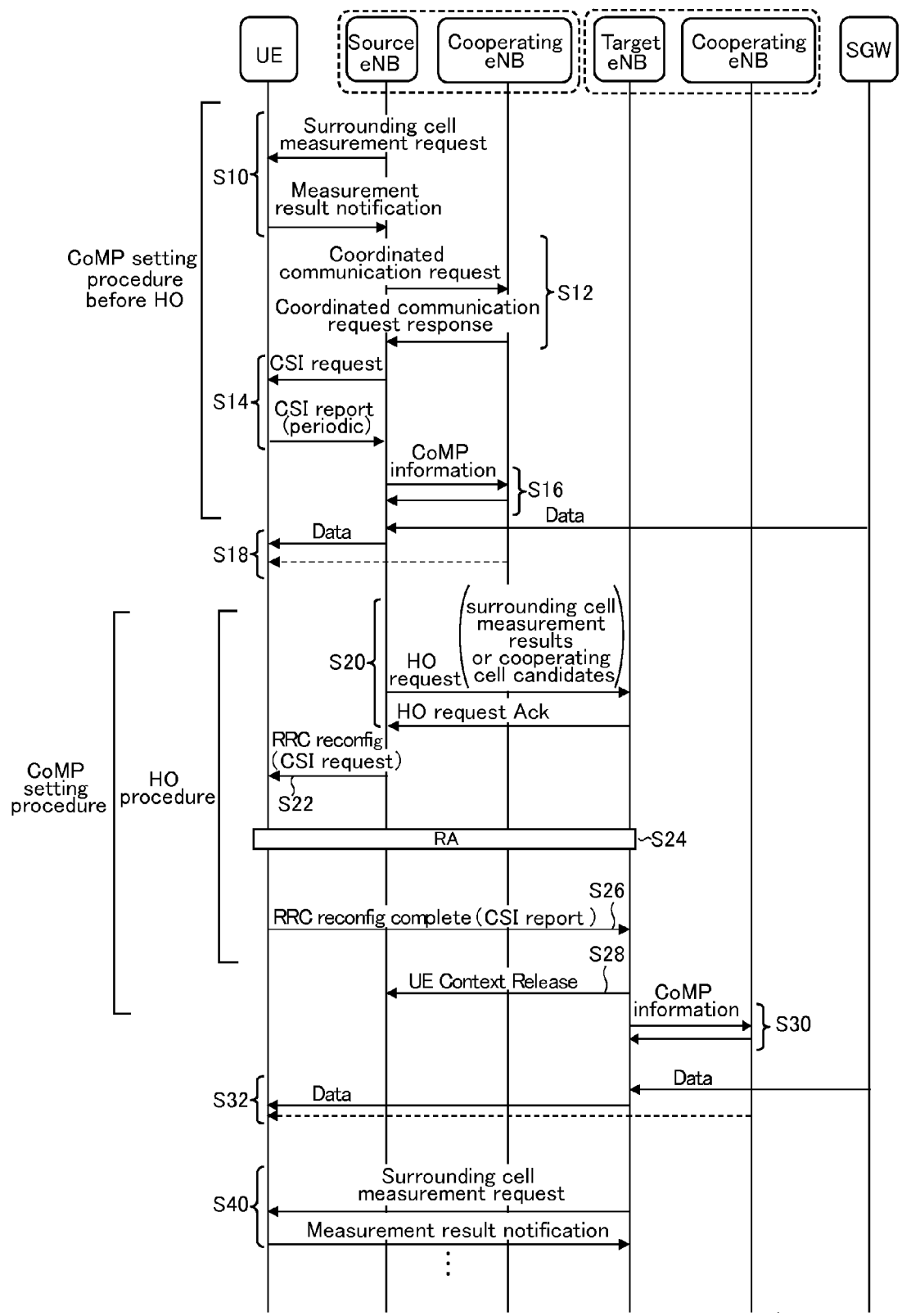
FIG. 5 is a diagram illustrating an example of a series of sequences of a CoMP setting procedure before and after a handover for a mobile station in a first embodiment.

Next, the CoMP setting procedure before and after a handover of a user equipment in the mobile communication system of a first embodiment will be described with reference to FIG. 5. FIG. 5 is a diagram illustrating an example of a series of sequences of the CoMP setting procedures (communication setting method) before and after a handover of a user equipment in the first embodiment. Hereinafter, an example where the technique represented by Eq. (1) described above is used as the technique of identifying coordinated cell candidates will be described, as one example.

In FIG. 5, Steps S10 to S18 represent the CoMP setting procedure in a user equipment UE before a handover. Firstly, the source evolutional Node B (source eNB) sends a surrounding cell measurement request message to a user equipment UE. In response to that request, the user equipment UE measures the RSRPs of reference signal from surrounding cells, and notifies the source evolutional Node B of the measurement results (Step S10). Note that the measurement results are also used for determination by source evolutional Node B as of whether the user equipment UE has been handed over (i.e., detection of the handover).

The source evolutional Node B identifies the serving cell of the user equipment UE and coordinated cell candidates, based on the notified measurement result, with the technique represented by Eq. (1) described above. The source evolutional Node B sends a coordinated communication request message to the cooperating evolutional Node Bs (cooperating eNBs) cooperating with the source evolutional Node B, and receives responses for the request from the respective evolutional Node Bs (Step S12). Thereafter, the source evolutional Node B sends a CSI request message requesting to measure the CSI, as propagation path information between each of the coordinated cell candidates and the user equipment UE, to the user equipment UE, and receives measurement results from the user equipment UE in a CSI report message (Step S14). The source evolutional Node B can identify a serving cell and a coordinated cell among the coordinated cell candidates, based on the CSI measurement results with the respective coordinated cell candidates, which are notified from the user equipment UE.

One technique of identifying a coordinated cell from coordinated cell candidates is described, for example, in the following Non-patent Reference, namely, "3GPP TSG RAN WG1 Meeting #57, R1-092160, San Francisco, USA 4-8 May 2009, Title: DL non-coherent multi-user MIMO joint transmission (MU-MIMO JT) scheme and system performance evaluations in TDD systems" which is incorporated herein by a reference. Hereinafter, the technique described in the reference is summarized.

As one example, when $H_{11}$, $H_{12}$, and $H_{13}$ are the CSIs of downlink signals from the serving cell and two coordinated cell candidate to the user equipment UE, respectively, and $W_{11}$, $W_{12}$, and $W_{13}$ are the precoding matrixes set in accordance with $H_{11}$, $H_{12}$, and $H_{13}$, the CSI under coordinated communications among the three cells, $H_0$, is represented by the following Eq. (5). Here, when the condition is satisfied in that the communication capacity calculated based on $H_0$ is three or more times higher than the communication capacity calculated by the CSI of the serving cell ($H_{11}$), it is preferable to provide coordinated transmissions by the three cells. Hence, for example, it is possible to identify two cells that satisfy the above condition from three or more coordinated cell candidate.

Eq. (5)

$$H_0 = H_{11}W_{11} + H_{12}W_{12} + H_{13}W_{13} \qquad (5)$$

Once the coordinated cell is identified, the source evolutional Node B sends CoMP information to the cooperating evolutional Node B through a communication link between the evolutional Node B, such as the one embodied by the X2 interface, for example, and receives an acknowledgement signal for that transmission (Step S16). The contents of the CoMP information may vary depending on the particular CoMP communication technique. In the case where the CoMP communication technique is the joint transmissions, for example, transmission data, propagation path information, scheduling information, precoding setting information, and the like are included. Thereafter, the source evolutional Node B and its cooperating evolutional Node B executes coordinated transmissions of data signals (data) to the user equipment UE (Step S18).

Then, in response to detecting a handover based on measurement results of the RSRPs of the reference signals from surrounding cells by the user equipment UE, the source evolutional Node B sends an HO request message to the evolutional Node B that is target of the handover (target eNB), and receives an acknowledgement signal (HO request Ack) for the request (Step S20). Here, the HO request message is generated so as to include, as first information, the surrounding cell measurement results from the user equipment UE obtained by the source evolutional Node B in Step S10 (the latest results at the time of the detection of the handover), or information about coordinated cell candidates identified using the surrounding cell measurement results. This helps to accelerates processing of the CoMP setting procedure in the target evolutional Node B.

The source evolutional Node B also requests (CSI request) the user equipment UE to measures the CSI as propagation path information between the respective coordinated cell candidates and the user equipment UE, when surrounding cells of the user equipment UE or coordinated cell candidates have been already identified. This request is included in a Radio Resource Control (RRC) reconfiguration message (RRC reconfig) sent in Step S22. Note that, in the present embodiment, the Information Element (IE) included in the RRC reconfiguration message is extended from the standards of the LTE, for example, with addition of the CSI request. In this manner, by sending a CSI request by the source evolutional Node B to the user equipment UE, in place of the target evolutional Node B, communication processing between the source evolutional Node B and the target evolutional Node B can be simplified and the target evolutional Node B can obtain CSI measurement results earlier from the user equipment UE. This helps to accelerate the CoMP setting procedure.

In Step S24, the user equipment UE establishes communications with the target evolutional Node B using an uplink random access channel (RACH). For example, in response to the HO request message, the target evolutional Node B allocates an access slot of a dedicated RACH to the user equipment UE, and notifies the user equipment UE of the allocated access slot. When the link with the source evolutional Node B is disconnected, the user equipment UE sends the dedicated RACH using the allocated access slot, and executes processing for establishing a communication link with the target evolutional Node B Once a communication with the target evolutional Node B is established, the user equipment UE sends an RRC reconfiguration complete message ("RRC reconfig complete") to the target evolutional Node B (Step S26). At this time, the user equipment UE has measured the CSI with the coordinated cell candidates in response to the CSI request received in Step S22, the user equipment UE includes the measurement results (CSI report) in the RRC reconfiguration complete message. Note that, in the present embodiment, the IE included in the RRC reconfiguration complete message is extended from the standards of the LTE, for example, with addition of the CSI report. In the present embodiment, the target evolutional Node B is able to obtain the CSI report earlier, and accordingly, the target evolutional Node B can identify a coordinated cell swiftly. Thereafter, a UE context release message (UE Context Release) is sent from the target evolutional Node B to the source evolutional Node B (Step S28), and the handover procedure is completed.

At the time when the handover procedure is completed, a coordinated cell has been already identified by the target evolutional Node B, in the mobile communication system of the present embodiment. Hence, the target evolutional Node B can immediately send CoMP information to a cooperating evolutional Node B, and obtain acknowledgement signal for the transmission (Step S30). Thereafter, the source evolutional Node B and the cooperating evolutional Node B executes coordinated transmissions of data signals (data) to the user equipment UE (Step S32). After coordinated transmissions for the handover are started, in the similar manner to Step S10, for further handover of the user equipment UE and/or update of coordinated cells, the source evolutional Node B periodically sends a surrounding cell measurement request message to a user equipment UE (Step S40).

(1-3) Configurations of Evolutional Node B and User Equipment

Next, examples of the configurations of the evolutional Node B and the user equipment for achieving the CoMP setting procedure depicted in FIG. 5 will be described with reference to FIGS. 6 and 7. The configurations depicted in FIGS. 6 and 7 are compliant with the LTE communication standards, more specifically, downlink communications adopt the OFDM while uplink communications adopt the SC-FDMA.

Figure 6:
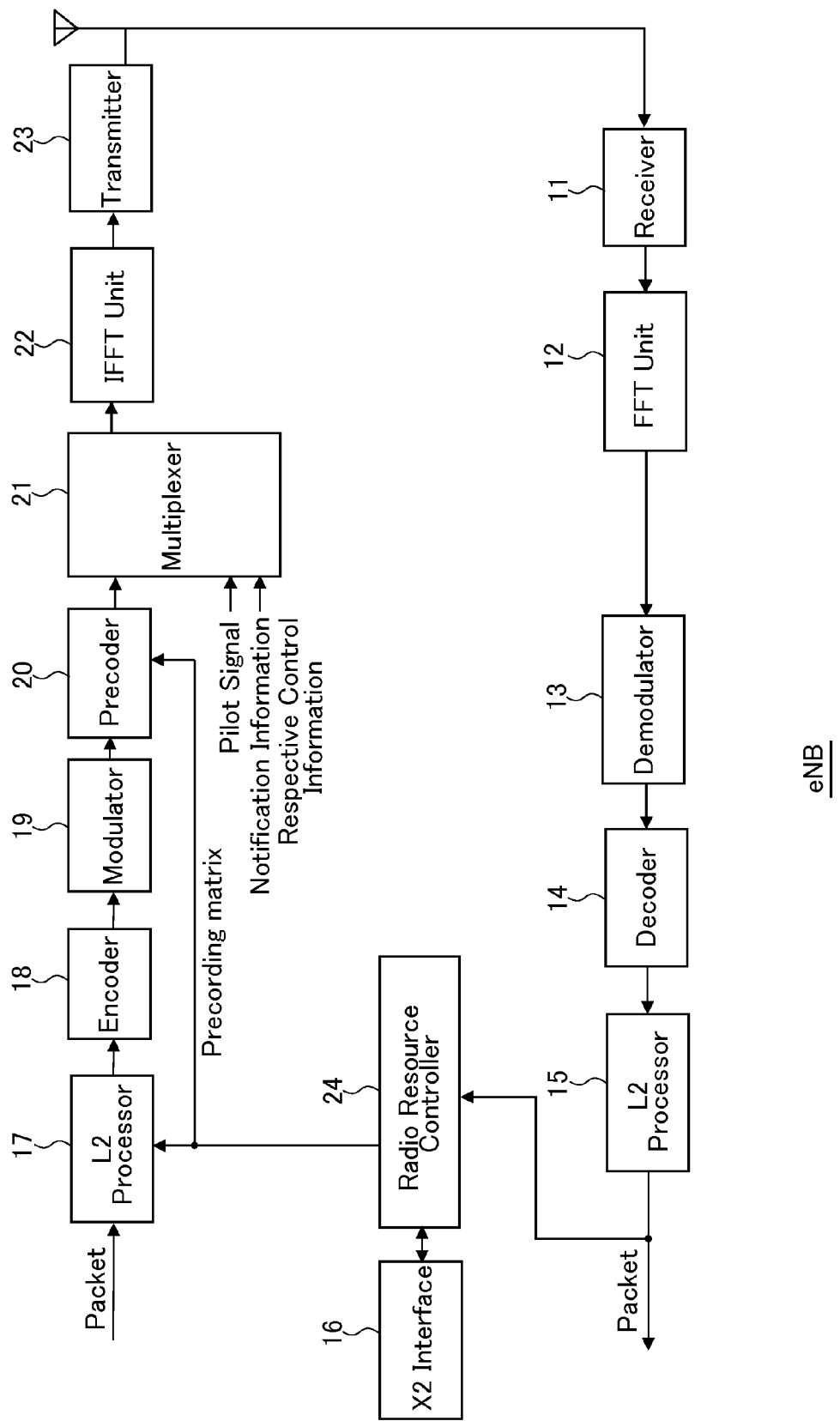
FIG. 6 is a block diagram illustrating of a schematic configuration of an evolutional Node B in the first embodiment.
Figure 7:
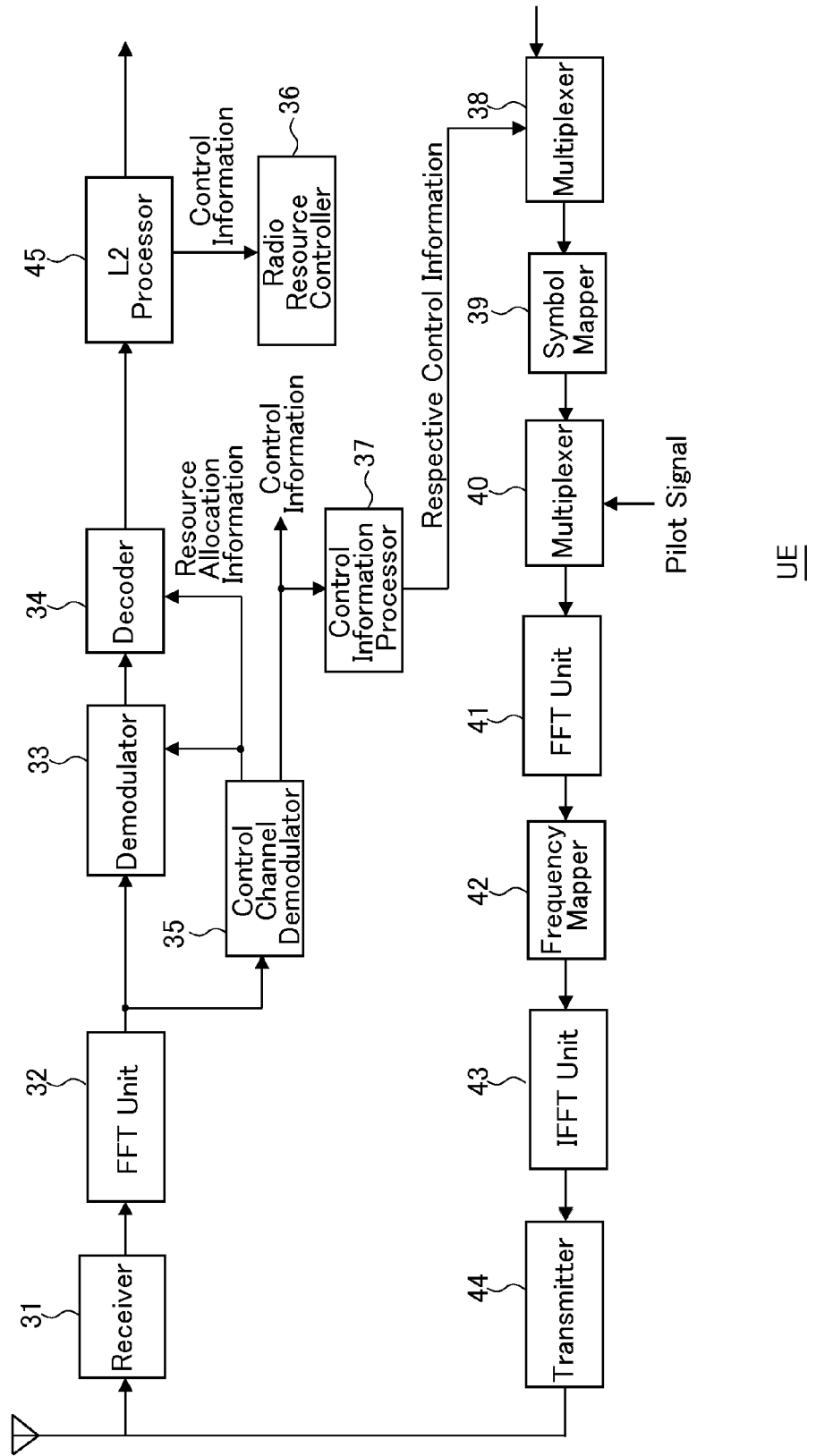
FIG. 7 is a block diagram illustrating of a schematic configuration of a mobile station in the first embodiment.

Firstly, with reference to FIG. 6, an evolutional Node B eNB of the present embodiment includes a receiver 11 as a first transceiver, an FFT unit 12, a demodulator 13, a decoder 14, a L2 processor 15, an X2 interface 16 as a second transceiver, an L2 processor 17, an encoder 18, a modulator 19, a precoder 20, a multiplexer 21, an IFFT unit 22, a transmitter 23 as the first transceiver, and a radio resource controller 24.

The L2 processor 17 executes protocol processing (signal conversion processing) in Layer 2 (L2) on packets to be sent from upper layers. More specifically, the L2 processor 17 executes processing in two steps, namely the sublayers of the Radio Link Control (RLC) and the Medium Access Control (MAC). In the processing on the RLC sublayer, the packets to be sent are divided or combined to form a processing length suitable for retransmission control and order control processing, and a RLC-protocol data unit (PDU) is generated where information required for processing such as flow control function, protocol error detection and recovery, and the like. In the processing on the MAC sublayer, multiplexing or demultiplexing a logical channel, relations between the logical channel and a transport channel, priority control, and scheduling processing are executed. At this time, a MAC-PDU that may include an MAC header, and one or more MAC-service data units (SDU) and MAC control elements is generated.

In the signal processing from the encoder 18 to the transmitter 23, processing on the PHY layer (physical layer) is executed. In the encoder 18, for a signal supplied from the L2 processor 17, encoding processing for error correction is executed, such as with turbo encoding, for example, and the modulator 19 executes modulation processing on the encoded signal. Preferably, modulation and encoding techniques in the encoder 18 and the modulator 19 are selected adaptively based on downlink quality information fedback from the user equipment.

The precoder 20 executes encoding on modulated signal obtained in the modulator 19, based on the Precoding matrix, as precoding setting information provided from the radio resource controller 24. Thereby, respective weights for transmission antennas from each layer are identified, when multi-layer communications are executed by the multi input multi output (MIMO).

The multiplexer 21 multiplexes the signal from the precoder 20, a pilot signal as a reference signal, notification information, and control information for each user equipment UE. Te IFFT unit 22 converts multiplexed signal obtained in the multiplexer 21 to a time domain signal (baseband signal) to each subcarrier signal by executing an inverse fast Fourier transform (IFFT) processing on the multiplexed signal.

The transmitter 23 includes a digital to analog (D/A) converter, a local frequency oscillator, a mixer, a power amplifier, a filter, and the like. The transmitter 23 upconverts and the like the baseband signal from the IFFT unit 22 from a baseband frequency to a radio frequency, and transmits it to space from the transmission antenna.

The receiver 11 converts the RF signal received from the user equipment via the reception antenna to a digital baseband signal. The receiver 11 includes a bandwidth shaping filter, a low noise amplifier (LNA), a local frequency oscillator, an orthogonal demodulator, an automatic gain control (AGC) amplifier, an analog to digital (A/D), and the like.

The FFT unit 12 executes FFT processing on the received baseband signal using a predetermined fast Fourier transform (FFT) window to generate an encoded symbol series (frequency domain signal) for each subcarrier. The frequency domain signal demodulated and decoded by the demodulator 13 and the decoder 14, respectively. The L2 processor 15 executes protocol processing in Layer 2 (L2) on the decoded signal to obtain a reception packet.

The radio resource controller 24 primarily executes controls for coordinated transmissions, including the CoMP setting procedure depicted in FIG. 5, and controls for a handover of the user equipment UE.

The radio resource controller 24 controls the L2 processor 17 such that a surrounding cell measurement request is sent to each user equipment UE in the CoMP setting procedure. The radio resource controller 24 further identifies coordinated cell candidates in accordance with the technique represented by Eq. (1) described above, for example, based on a notification of measurement results of surrounding cells (results of an RSRP measurement) from the user equipment UE, which is included in a control signal from the user equipment UE obtained by the L2 processor 15.

The radio resource controller 24 sends a coordinated communication request to evolutional Node Bs of identified coordinated cell candidates, and receives response signals for the coordinated communication request from the respective evolutional Node Bs, through the X2 interface 16, in the CoMP setting procedure.

The radio resource controller 24 controls the L2 processor 17 to send a CSI request for requesting the user equipment UE that is a target of coordinated transmissions, to measures the CSIs with the coordinated cell candidates, in the CoMP setting procedure. The radio resource controller 24 further identifies coordinated cells based on a CSI report from the user equipment UE, included in the control signal from the user equipment UE obtained by the L2 processor 15, and notifies the L2 processor 17 and the precoder 20 of the precoding matrix for executing coordinated transmissions. Note that, the precoding matrix based on the CSI may be selected based on the codebook scheme, for example.

In the present embodiment, the CSI request is made included in an IE in an RRC reconfiguration message (RRC reconfig) while a handover procedure is being executed. In the present embodiment, a CSI report from the user equipment UE for a CSI request is made included in an IE in an RRC reconfiguration complete message ("RRC reconfig complete").

The radio resource controller 24 sends CoMP information to a cooperating evolutional Node B which cooperates with the evolutional Node B, via the interface 16, in the CoMP setting procedure. The CoMP information includes transmission data to the user equipment UE, propagation path information (CSI report from the user equipment UE), scheduling information, precoding setting information (precoding matrix to be set in the serving and coordinated cells), and the like, for example. The scheduling information includes the location of a resource element in a resource block to which transmission data (PDSCH) to the user equipment UE is allocated, for example.

The radio resource controller 24 detects a handover based on the measurement results of the RSRPs of the reference signals from surrounding cells by the user equipment UE, and communicates with the target evolutional Node B thorugh the X2 interface 16 when executing controls for the handover of the user equipment UE.

For example, in response to detecting a handover, the radio resource controller 24 sends an HO request signal to the target evolutional Node B thorugh the X2 interface 16, and receives an acknowledgement signal for the request. Here, the HO request signal is generated so as to include the surrounding cell measurement results of the user equipment UE possessed by the source evolutional Node B (the latest results at the time of the detection of the handover), or coordinated cell candidates identified using the surrounding cell measurement results.

Next, with reference to FIG. 7, a user equipment of the present embodiment UE includes a receiver 31 as a third transceiver, an FFT unit 32, a demodulator 33, a decoder 34, a control channel demodulator 35, a radio resource controller 36, a control information processor 37, a multiplexer 38, a symbol mapper 39, a multiplexer 40, an FFT unit 41, a frequency mapper 42, an IFFT unit 43, a transmitter 44 as the third transceiver, and an L2 processor 45.

The receiver 31 converts an RF signal received at the reception antenna to a digital baseband signal, and the FFT unit 32 executes FFT processing on the digital baseband signal to generate a frequency domain signal.

The control channel demodulator 35 demodulates a control channel signal in the frequency domain signal obtained from the FFT unit 32, and provides the demodulator 33 and the decoder 34 with information of a resource allocation included in that signal. The control channel demodulator 35 also provides the demodulator 33 and the decoder 34 with the demodulator 33 and the decoder 34 of the radio resource allocated to the user equipment included in the demodulated control information. The demodulated control information is also provided to the control information processor 37.

The control information processor 37, as an estimator and a quality measurement section, measures the RSRPs and the CSIs with coordinated cell candidates, based on reference signals, such as pilot signals (from cell connecting to the user equipment and from surrounding cells signal) obtained by the FFT unit 32. These measurement results are included in dedicated control information, for example. The control information processor 37 may be embodied using a digital signal processor (DSP) or a part of a DSP, for example.

The L2 processor 45 executes protocol processing in Layer 2 (L2) on decoded signal. The radio resource controller 36 primarily executes controls for coordinated transmissions, including the CoMP setting procedure depicted in FIG. 5, and controls for a handover of the user equipment.

The radio resource controller 36, in response to a surrounding cell measurement request from an evolutional Node B in a message included in the control information obtained by the L2 processor 45, and an CSI request, controls the control information processor 37 to measures the surrounding cells and the CSI. The radio resource controller 36 also controls such that these measurement results (surrounding cell measurement result notifications and CSI report) are included in a message sent to the evolutional Node B.

The radio resource controller 36 establishes a communication with the target evolutional Node B, using an uplink channel RACH during a handover procedure. Once communications with a target evolutional Node B are established, the radio resource controller 36 controls such that an RRC reconfiguration complete message ("RRC reconfig complete") including a CSI report is sent to the target evolutional Node B, in response to a CSI request from a source evolutional Node B.

The multiplexer 38 multiplexes dedicated control information and transmission data for an evolutional Node B provided from the control information processor 37. The symbol mapper 39 allocates the multiplexed signal to multiple symbols in a unit of transmission time interval (TTI). The multiplexer 40 executes further multiplexing by allocating a pilot signal as a reference signal in the unit of TTI as a reference symbol. The FFT unit 41 converts a time domain signal output from the multiplexer 40 to a frequency domain signal by executing FFT processing in the size the same as the size of an input symbol. The frequency domain signal is mapped to continuous frequencies allocated to the user equipment by the frequency mapper 42 (frequencies which do not overlap with frequencies for other user equipments UE), and then is converted to a time domain signal in the IFFT unit 43. The time domain signal is upconverted by the transmitter 44 and is sent to the evolutional Node B.

As set forth above, in the present embodiment, when a handover of a user equipment which is a target of coordinated communications among multiple wireless evolutional Node Bs is detected, at least a part of setting procedure for the coordinated communications (CoMP setting procedure described above) is executed before completion of the handover. Accordingly, the coordinated transmission for the user equipment can be resumed earlier after the handover, and any reduction in the communication quality or throughput caused by the resume of the coordinated communication after the handover of the user equipment can be prevented.

(2) Second Embodiment

Figure 8:
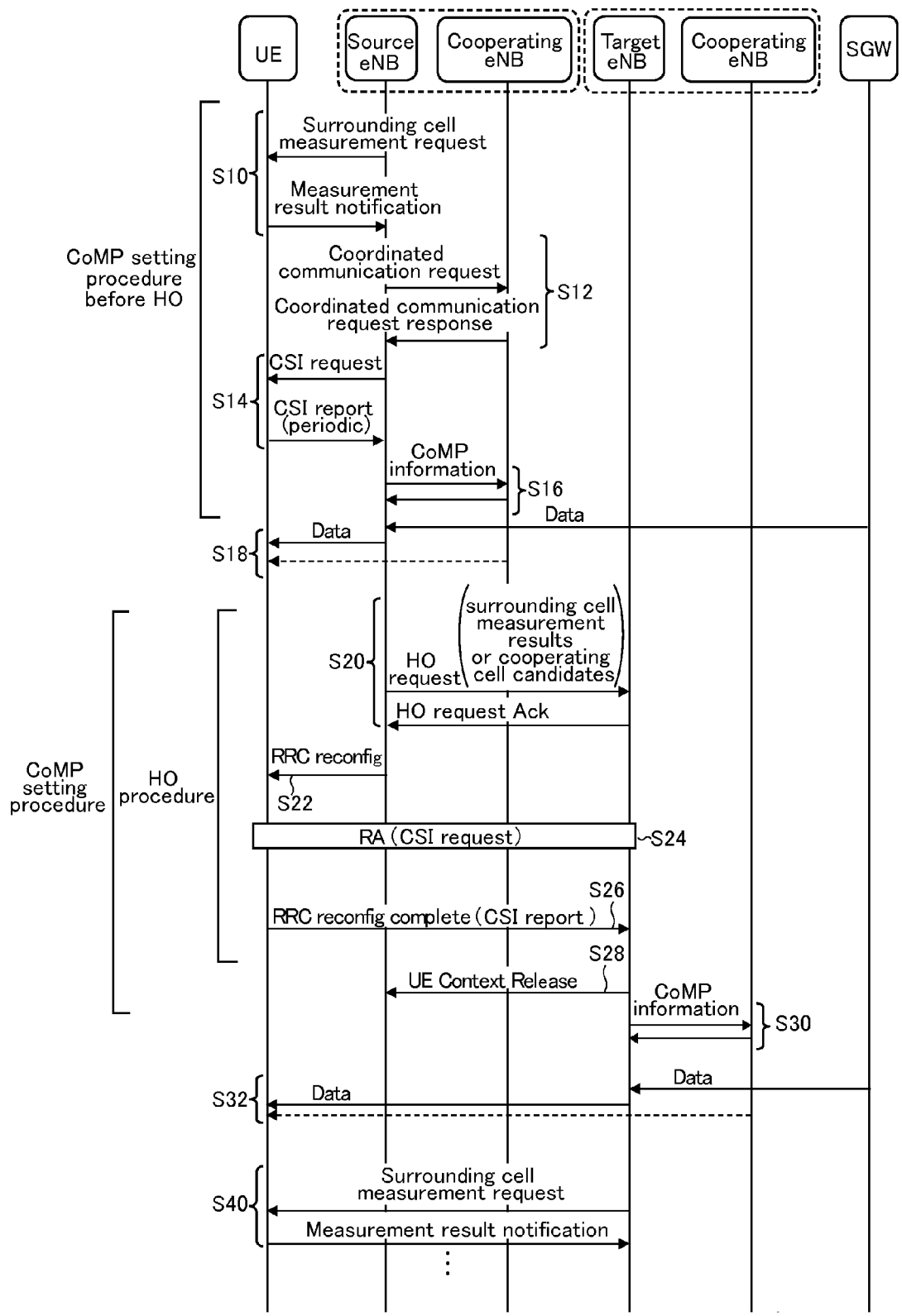
FIG. 8 is a diagram illustrating an example of a series of sequences of a CoMP setting procedure before and after a handover for a mobile station in a second embodiment.

Hereinafter, the CoMP setting procedure before and after a handover of a user equipment in the mobile communication system of a second embodiment will be described with reference to FIG. 8. FIG. 8 is a diagram illustrating an example of a series of sequences of the CoMP setting procedures (communication setting method) before and after a handover of a user equipment in the second embodiment.

For eliminating any duplicated descriptions, processing in the sequence of FIG. 8 different from that of FIG. 5 in relation to the first embodiment will be described. In the sequence of the present embodiment, a CSI request to a user equipment UE is not included in an RRC reconfiguration message (RRC reconfig) from a source evolutional Node B, and a CSI request is notified from a target evolutional Node B to the evolutional Node B eNB (Step S24) during a establishment of communications between the user equipment UE and the target evolutional Node B. In this case, the user equipment UE notifies a CSI request from the target evolutional Node B in a down link shared channel (DL-SCH).

Note that a the target evolutional Node B receives a CSI report in an RRC reconfiguration complete message ("RRC reconfig complete") after communications are established between the user equipment UE and the target evolutional Node B, in the manner similar to the first embodiment.

Similarly to the first embodiment, in the mobile communication system of the present embodiment, the target evolutional Node B also an receive a CSI report before completion of the handover procedure, which helps to accelerates processing of the CoMP setting procedure in the target evolutional Node B. In other words, similarly to the first embodiment, the coordinated transmission for the user equipment can be resumed earlier after the handover, and any reduction in the communication quality or throughput caused by the resume of the coordinated communication after the handover of the user equipment can be prevented.

(3) Third Embodiment

Figure 9:
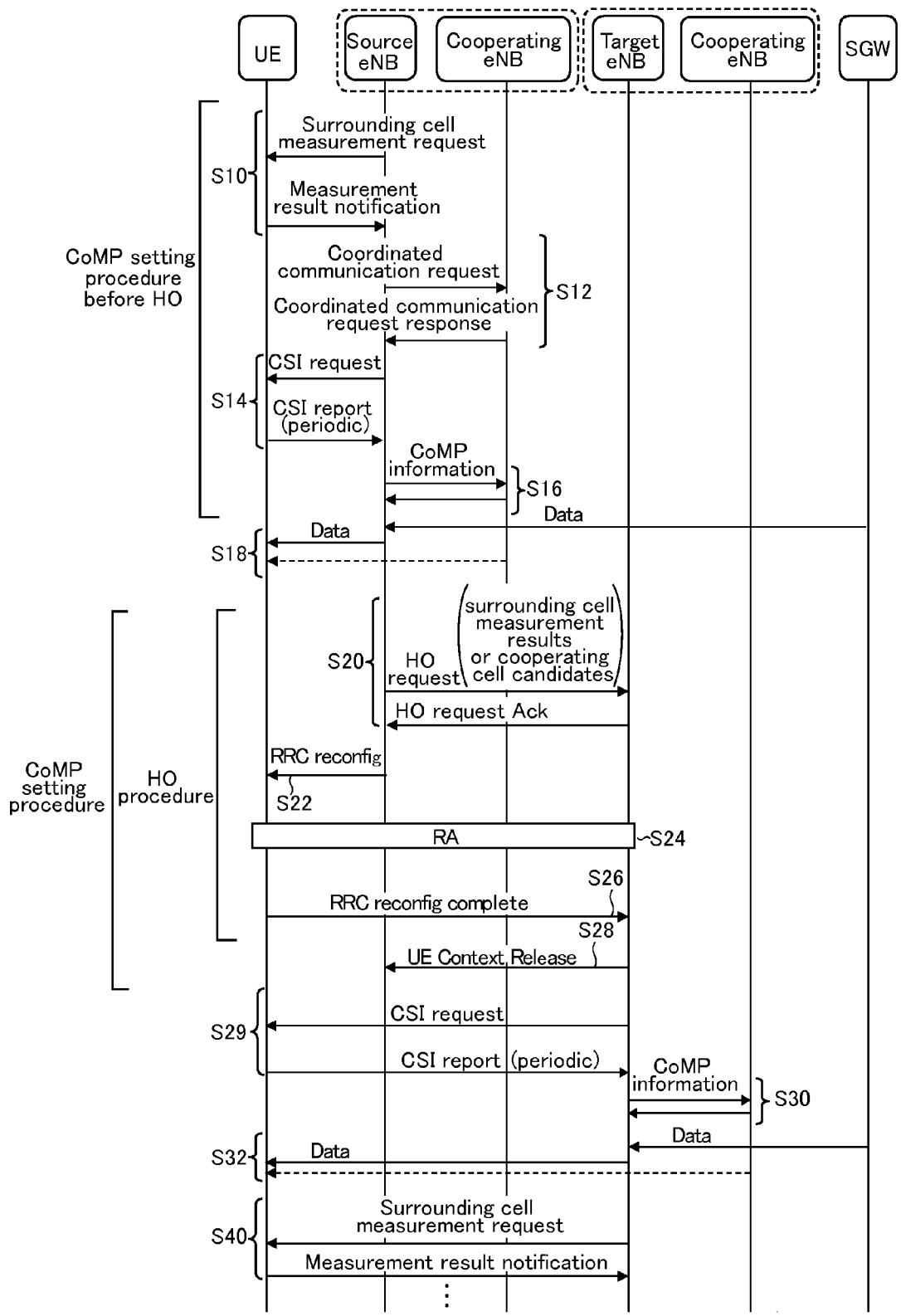
FIG. 9 is a diagram illustrating an example of a series of sequences of a CoMP setting procedure before and after a handover for a mobile station in a third embodiment.

Hereinafter, the CoMP setting procedure before and after a handover of a user equipment in the mobile communication system of a third embodiment will be described with reference to FIG. 9. FIG. 9 is a diagram illustrating an example of a series of sequences of the CoMP setting procedures (communication setting method) before and after a handover of a user equipment in the third embodiment.

For eliminating any duplicated descriptions, processing in the sequence of FIG. 9 different from that of FIG. 5 in relation to the first embodiment will be described. In the sequence of the present embodiment, after a UE context release message (UE Context Release) is sent to a user equipment (Step S28), a CSI request to the user equipment UE is sent from a target evolutional Node B to the user equipment UE (Step S29). Thereafter, the target evolutional Node B identifies a coordinated cell, and sends CoMP information to a cooperating evolutional Node B that manages that coordinated cell (Step S30).

In the mobile communication system of the present embodiment, a CSI request is made from the target evolutional Node B to a user equipment UE, in a later timing compared to the first and second embodiments. However, a notification of surrounding cell measurement results by the user equipment UE is made at earlier stage of the handover procedure (i.e., in Step S20). Hence, the target evolutional Node B does not receive notifications of cell measurement results by the user equipment UE after the handover, and the coordinated communication processing by the target evolutional Node B is accelerated. In other words, similarly to the first embodiment, the coordinated transmission for the user equipment can be resumed earlier after the handover, and any reduction in the communication quality or throughput caused by the resume of the coordinated communication after the handover of the user equipment can be prevented.

While the embodiments of the present invention have been described in detail, a communication setting method, a wireless base station, and a mobile station of the present invention are not limited to the embodiments discussed above. It is noted that various modifications and variations may be practiced without departing from the spirit of the invention.

The above-described embodiment has been described where at least a part of the CoMP setting procedure is executed when a handover of a user equipment is detected and the at least a part of the CoMP setting procedure is executed before completion of the handover. However, processing of the CoMP setting procedure is not limited to the timing when a handover is detected or the completion of the handover. For example, although a HO request message that includes surrounding cell measurement or information about coordinated cell candidates identified using the surrounding cell measurement results is sent from a source evolutional Node B to a target evolutional Node B in Step S20 in FIG. 5, in the first embodiment, this is not limiting. The timing when the measurement results or the information is sent to the target evolutional Node B is not limited to timing of the handover and may be sent anytime based on the surrounding cell measurement results.

In accordance with the communication setting method, the wireless base station, and the mobile station disclosed, a coordinated communication after a handover of a mobile station can be resumed earlier, when a coordinated communication is made by multiple wireless base stations to the mobile station.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method of communication setting for performing coordinated multi-point communications by a plurality of wireless base stations on a mobile station, the plurality of wireless base stations providing wireless services, the method comprising:

measuring, by the mobile station that communicates with a first wireless base station, a reception quality of a reference signal from the plurality of wireless base stations including, the first wireless base station and a second wireless base station adjacent to the first wireless base station, and notifying the first wireless base station of the reception quality in response to a detection of a handover of the mobile station, during the coordinated multi-point communications, from the first wireless base station to the second wireless base station based on the reception quality; and notifying the second wireless base station by the first wireless base station, of first information including one of the notified reception quality notified from the mobile station, and information about candidates of a plurality of wireless base stations that perform the coordinated multi-point communications identified by the second base station based on the notified reception quality notified from the mobile station, the first information enabling the second wireless base station to reselect at least one of a third wireless base stations among the plurality of wireless base stations including the second wireless base station to perform a new coordinated multi-point communications on the mobile station by the reselected at least one of the third wireless base stations.

2. The method for communication setting according to claim 1, wherein the notification to the second wireless base station by the first wireless base station is made after the detection of a handover of the mobile station from the first wireless base station to the second wireless base station based on the notified reception quality from the mobile station, and before the handover is completed.

3. The method for communication setting according to claim 2, wherein notifying the second wireless base station by the first wireless base station comprises sending a handover request signal so as to include the first information.

4. A method of communication setting for performing coordinated multi-point communications by a plurality of wireless base stations on a mobile station, the plurality of wireless base stations providing wireless services, the method comprising:
  measuring, by the mobile station that communicates with a first wireless base station, a reception quality of a reference signal from the plurality of wireless base stations including, the first wireless base station and a second wireless base station adjacent to the first wireless base station, and notifying the first wireless base station of the reception quality in response to a detection of a handover of the mobile station from the first wireless base station to the second wireless base station based on the reception quality during the coordinated multi-point communications;
  notifying the second wireless base station by the first wireless base station, of first information including one of the notified reception quality notified from the mobile station, and information about candidates of a plurality of wireless base stations that perform the coordinated multi-point communications identified by the second base station based on the notified reception quality notified from the mobile station, the first information enabling the second wireless base station to reselect the plurality of wireless base stations including the second wireless base station to perform a new coordinated multi-point communications on the mobile station by the reselected wireless base stations, wherein the notification to the second wireless base station by the first wireless base station is made after the detection of a handover of the mobile station from the first wireless base station to the second wireless base station based on the notified reception quality from the mobile station, and before the handover is completed;
  requesting, by the first wireless base station, after notifying the second wireless base station of the first information, the mobile station to notify propagation path information between the mobile station and the candidates of a plurality of wireless base stations before the completion of the handover; and
    notifying, by the mobile station, the second wireless base station of the propagation path information.

5. The method for communication setting according to claim 4, further comprising:
  requesting, by the second wireless base station, in response to the notification of the first information, the mobile station to notify propagation path information between the mobile station and the candidates of a plurality of wireless base stations, before or after the completion of the handover; and
    notifying, by the mobile station, the second wireless base station of the propagation path information.

6. The method for communication setting according to claim 4, wherein the requesting by the first wireless base station to notify the propagation path information comprising sending a signal related to a radio resource control to the mobile station so as to include the request.

7. The method for communication setting according to claim 4, wherein the notifying the propagation path information by the mobile station to the second wireless base station comprises sending a response signal to a signal related to a radio resource control so as to include the propagation path information.

8. The method for communication setting according to claim 5, wherein the requesting by the second wireless base station to notify the propagation path information comprising sending a signal related to an access control to the mobile station so as to include the request.

9. The method for communication setting according to claim 5, wherein the notifying the propagation path information by the mobile station to the second wireless base station comprises sending a response signal to a signal related to a radio resource control so as to include the propagation path information.

10. A wireless base station as a first wireless base station for performing coordinated multi-point communications with a second wireless base station on a mobile station, the first wireless base station comprising:
  a first transceiver that communicates with the mobile station and sends and receives a signal; and
  a second transceiver that sends and receives another signal to and from the second wireless base station,
  wherein the first transceiver receives, from the mobile station that communicates with the first wireless base station, a notification of measurement results of reception quality of reference signals from a plurality of wireless base stations including the first wireless base station and the second wireless base station adjacent to the first wireless base station, the notified reception quality in response to a detection of a handover of the mobile station, during the coordinated multi-point communications, from the first wireless base station to the second wireless base station based on the reception quality, and the second transceiver notifies the second wireless base station, of first information including one of the notified reception quality notified from the mobile station, and information about candidates of a plurality of wireless base stations that perform the coordinated multi-point communications identified by the second base station based on the notified reception quality notified from the mobile station, the first information enabling the second wireless base station to reselect at least one of a third wireless base stations among the plurality of wireless base stations including the second wireless base station to perform a new coordinated multi-point communications on the mobile station by the reselected at least one of the third wireless base stations.

11. The wireless base station according to claim 10, wherein
  the second transceiver performs the notification of the first information after the detection of a handover of the mobile station from the first wireless base station to the second wireless base station based on the reception quality notified from the mobile station, and before the handover is completed.

12. A wireless base station as a first wireless base station for performing coordinated multi-point communications with a second wireless base station on a mobile station, the first wireless base station comprising:
  a first transceiver that communicates with the mobile station and sends and receives a signal; and
  a second transceiver that sends and receives another signal to and from the second wireless base station,
  wherein the first transceiver receives, from the mobile station that communicates with the first wireless base station, a notification of measurement results of reception quality of reference signals from a plurality of wireless base stations including the first wireless base station and the second wireless base station adjacent to the first wireless base station, the notified reception quality in response to a detection of a handover of the mobile station from the first wireless base station to the second wireless base station based on the reception quality during the coordinated multi-point communications, the second transceiver notifies the second wireless base station, of first information including one of the notified reception quality notified from the mobile station, and information about candidates of a plurality of wireless base stations that perform the coordinated multi-point communications identified by the second base station based on the notified reception quality notified from the mobile station, the first information enabling the second wireless base station to reselect the plurality of wireless base stations including the second wireless base station to perform a new coordinated multi-point communications on the mobile station by the reselected wireless base stations, wherein the second transceiver performs the notification of the first information after the detection of a handover of the mobile station from the first wireless base station to the second wireless base station based on the reception quality notified from the mobile station, and before the handover is completed, and wherein the first transceiver requests, after notifying the second wireless base station of the first information by the second transceiver, the mobile station to notify propagation path information between the mobile station and the candidates of a plurality of wireless base stations before the completion of the handover.

13. A wireless base station as a second wireless base station for performing wireless services and coordinated multi-point communications with a first wireless base station on a mobile station, the second wireless base station comprising:

a first transceiver that communicates with the mobile station and sends and receives a signal; and a second transceiver that sends and receives another signal to and from the first wireless base station, wherein the second transceiver receives from the first wireless base station, in response to a detection of a handover of the mobile station, during the coordinated multi-point communications, from the first wireless base station to the second wireless base station based on a reception quality, as first information for performing the coordinated multi-point communications among a plurality of wireless base stations including the second wireless base station for the mobile station that communicates with the first wireless base station adjacent to the second wireless base station, a reception quality of reference signals from the plurality of wireless base stations including the second wireless base station and the first wireless base station, a notification of the reception quality notified from the mobile station, and information about candidates of a plurality of wireless base stations that perform the coordinated multi-point communications, identified by the second base station, enabling the second wireless base station to reselect at least one of a third base wireless stations among the plurality of wireless base stations including the second wireless base station to perform a new coordinated multi-point communications on the mobile station by the reselected at least one of the third wireless base stations.

14. The wireless base station according to claim 13, wherein the second transceiver receives the notification of the first information, after the handover of the mobile station from the first wireless base station to the second wireless base station is requested from the first wireless base station and before the handover is completed.

15. A wireless base station as a second wireless base station for performing wireless services and coordinated multi-point communications with a first wireless base station on a mobile station, the second wireless base station comprising:

a first transceiver that communicates with the mobile station and sends and receives a signal; and a second transceiver that sends and receives another signal to and from the first wireless base station, wherein the second transceiver receives from the first wireless base station, in response to a detection of another handover of the mobile station from the first wireless base station to the second wireless base station based on a reception quality during the coordinated multi-point communications, as first information for performing the coordinated multi-point communications among a plurality of wireless base stations including the second wireless base station for the mobile station that communicates with the first wireless base station adjacent to the second wireless base station, a reception quality of reference signals from the plurality of wireless base stations including the second wireless base station and the first wireless base station, a notification of the reception quality notified from the mobile station, and information about candidates of a plurality of wireless base stations that perform the coordinated multi-point communications, identified by the second base station, enabling the second wireless base station to reselect the plurality of wireless base stations including the second wireless base station to perform a new coordinated multi-point communications on the mobile station by the reselected wireless base stations, wherein the second transceiver receives the notification of the first information, after the handover of the mobile station from the first wireless base station to the second wireless base station is requested from the first wireless base station and before the handover is completed, and wherein the first transceiver requests, in response to the notification of the first information, the mobile station to notify propagation path information between the mobile station and the candidates of a plurality of wireless base stations, before or after the completion of the handover.

16. A mobile station that is capable of performing coordinated multi-point communications with a plurality of wireless base stations providing wireless services, the mobile station comprising:

a transceiver that sends and receives a signal to and from a wireless base station; and a quality measurement section that measures a reception quality of reference signals from the plurality of wireless base stations including a first wireless base station and a second wireless base station adjacent to the first wireless base station, wherein the transceiver notifies the first wireless base station of the measured reception quality, thereby enabling the first wireless base station to notify the second wireless base station, in response to a detection of a handover of the mobile station, during the coordinated multi-point communications, from the first wireless base station to the second wireless base station based on the reception quality, as first information for performing coordinated multi-point communications among the plurality of wireless base stations including the second wireless base station, the notified reception quality notified from the mobile station, and information about candidates of a plurality of wireless base stations that perform the coordinated multi-point communications identified by the first wireless base station based on the notified reception quality notified from the mobile station, the first information enabling the second wireless base station to reselect at least one of a third wireless base stations among the plurality of wireless base stations including the second wireless base station to perform a new coordinated multi-point communications on the mobile station by the reselected at least one of the third wireless base stations.

17. A mobile station that is capable of performing coordinated multi-point communications with a plurality of wireless base stations providing wireless services, the mobile station comprising:
a transceiver that sends and receives a signal to and from a wireless base station; and
a quality measurement section that measures a reception quality of reference signals from the plurality of wireless base stations including a first wireless base station and a second wireless base station adjacent to the first wireless base station,
wherein the transceiver notifies the first wireless base station of the measured reception quality, thereby enabling the first wireless base station to notify the second wireless base station, in response to a detection of a handover of the mobile station from the first wireless base station to the second wireless base station based on the reception quality during the coordinated multi-point communications, as first information for performing coordinated multi-point communications among the plurality of wireless base stations including the second wireless base station, the notified reception quality notified from the mobile station, and information about candidates of a plurality of wireless base stations that perform the coordinated multi-point communications identified by the first wireless base station based on the notified reception quality notified from the mobile station, the first information enabling the second wireless base station to reselect the plurality of wireless base stations including the second wireless base station to perform a new coordinated multi-point communications on the mobile station by the reselected wireless base stations; and
an estimator that estimates propagation path information between the mobile station and the wireless base stations,
wherein the transceiver, before the handover of the mobile station from the first wireless base station to the second wireless base station is completed, receives a request to notify the propagation path information between the mobile station and the wireless base stations from the first wireless base station, and notifies to the second wireless base station of the propagation path information obtained by the estimator.

18. The mobile station according to claim 17, further comprising an estimator that estimates propagation path information between the mobile station and the wireless base stations,
wherein the transceiver, before the handover of the mobile station from the first wireless base station to the second wireless base station is completed or after the completion of the handover, receives a request to notify the propagation path information between the mobile station and the wireless base stations from the second wireless base station, and notifies to the second wireless base station of the propagation path information obtained by the estimator.

* * * * *